US010181273B2

United States Patent
Norman et al.

(10) Patent No.: US 10,181,273 B2
(45) Date of Patent: Jan. 15, 2019

(54) SHELF CLIP WITH GRAPHIC HOLDER

(71) Applicant: Menasha Corporation, Neenah, WI (US)

(72) Inventors: Christopher Norman, Elm Grove, WI (US); Mike Pfeifer, Hartford, WI (US)

(73) Assignee: Menasha Corporation, Neenah, WI (US)

( * ) Notice: Subject to any disclaimer, the term of this patent is extended or adjusted under 35 U.S.C. 154(b) by 1 day.

(21) Appl. No.: 15/185,364

(22) Filed: Jun. 17, 2016

(65) Prior Publication Data

US 2016/0372012 A1 Dec. 22, 2016

Related U.S. Application Data

(60) Provisional application No. 62/180,840, filed on Jun. 17, 2015.

(51) Int. Cl.
| | |
|---|---|
| G09F 3/20 | (2006.01) |
| G09F 3/16 | (2006.01) |
| F16B 2/22 | (2006.01) |
| A47F 5/00 | (2006.01) |

(52) U.S. Cl.
CPC ............ *G09F 3/204* (2013.01); *A47F 5/0068* (2013.01); *F16B 2/22* (2013.01); *G09F 3/16* (2013.01)

(58) Field of Classification Search
USPC ...................................... 40/658, 661.03, 666
See application file for complete search history.

(56) References Cited

U.S. PATENT DOCUMENTS

| | | | | |
|---|---|---|---|---|
| 497,594 | A | * | 5/1893 | McGrady .................. G09F 1/12 |
| | | | | 40/647 |
| 925,757 | A | * | 6/1909 | Cuny |
| 1,475,315 | A | * | 11/1923 | Quin ......................... G09F 3/16 |
| | | | | 40/658 |
| 1,551,880 | A | * | 9/1925 | Holman ..................... G09F 3/16 |
| | | | | 24/343 |
| 1,763,024 | A | * | 6/1930 | Underhill ................. B42F 21/08 |
| | | | | 160/DIG. 5 |
| 2,103,106 | A | | 12/1937 | Yurkovitch |
| 3,011,235 | A | | 12/1961 | Pacheco |
| 4,389,133 | A | | 6/1983 | Oberst |
| 4,787,595 | A | | 11/1988 | Hegarty |
| 4,828,133 | A | | 5/1989 | Hougendobler |
| 4,925,146 | A | | 5/1990 | Hegarty |
| 5,044,594 | A | | 9/1991 | Hegarty |
| 5,080,238 | A | | 1/1992 | Hochman |
| 8,454,262 | B2 | | 6/2013 | Norman |
| 2005/0133676 | A1 | * | 6/2005 | Brinkman ............... G09F 3/204 |
| | | | | 248/223.41 |
| 2010/0129146 | A1 | | 5/2010 | Norman |
| 2010/0205841 | A1 | * | 8/2010 | Stancer, III ............. G09F 1/103 |
| | | | | 40/607.14 |

* cited by examiner

*Primary Examiner* — Joanne Silbermann
(74) *Attorney, Agent, or Firm* — Greensfelder, Hemker & Gale, P.C.

(57) ABSTRACT

A shelf clip having a first display holder and a second display holder is provided. The clip is configured to clip onto the lip of a shelf of shelving display.

16 Claims, 5 Drawing Sheets

SHELF CLIP WITH GRAPHIC HOLDER

CROSS-REFERENCE TO RELATED APPLICATIONS

The present invention claims the benefit of U.S. Provisional Application Ser. No. 62/180,840 filed Jun. 17, 2015, the contents of which are incorporated herein by reference.

FEDERALLY SPONSORED RESEARCH OR DEVELOPMENT

N/A

FIELD OF THE INVENTION

The present invention generally relates to a clip for a shelving display that can hold one or more graphic cards or other similar materials in one position, and one or more graphic cards or other similar materials in a second position.

BACKGROUND OF THE INVENTION

There are limited places for positioning graphics associated with goods on a shelving system. Moreover, because goods are moved around or change, or aspects of the goods can change (such as pricing), it is beneficial to quickly and easily change any advertising or other product information associated with the goods.

The present system provides an improved shelf clip for use with a shelving system for easily displaying graphics and other information.

SUMMARY OF THE INVENTION

The present invention provides a shelf clip for holding advertisements, pricing and other graphic displays. Additionally, the shelf clip can be used to hold a wall that acts as a barrier along the edge of the shelf to prevent goods from falling off the edge of the shelf. In some embodiments, a graphic display can act as a wall. The shelf clip can be a clear or translucent strip of plastic that includes a first holder and a second holder.

In accordance with one embodiment, a shelf clip comprises a first holder for holding one of a display card and a wall, a clip portion for securing the shelf clip to a shelf, and a second holder for holding a display card.

The first holder can include a first wall and a second wall connected to the first wall by an arcuate portion. The walls are separated a small distance and form a slot-like opening at the top. The first wall and the second wall of the first holder can be substantially parallel to each other. Alternatively, one or both of the first wall and the second wall of the first holder can be inclined toward the other in order to grip the display card or wall. The walls of the first holder can be substantially vertical when the shelf clip is secured to a shelf.

The first holder is designed to hold one or more display cards or other similar materials. Alternatively, the first holder can be used to hold a wall to prevent goods from falling off the shelf.

The second holder can also include a first wall and a second wall connected to the first wall by an arcuate portion. Similarly, the first wall and the second wall of the second holder can be substantially parallel to each other, or alternatively, inclined toward each other to better grip the display card. Unlike the first holder, the second holder can be inclined at an angle with respect to the first holder. Typically, the second holder is angled upward so that a consumer can read a price or label related to goods on the shelf.

The clip portion can include a first wall and a second wall connected by a top wall. In some embodiments, the first wall of the clip portion is the second wall of the first holder. The first wall of the clip portion can include an upwardly inclined hook portion extending from a bottom portion of the first wall. Similarly, the second wall of the clip portion can include an upwardly inclined hook portion extending from a bottom portion of the second wall. The hook portions help the clip portion grip the lip of the shelf.

The shelf clip can be formed from plastic or other similar materials. The plastic can be transparent or translucent.

In accordance with another embodiment, a shelf clip for holding display materials comprises a first display holder for holding a first display card, a clip portion integrally connected to the first display holder for securing the shelf clip to a shelf, and a second display holder integrally connected to the clip portion for holding a second display card. The first display holder can be positioned to hold the first display card in a substantially vertical position and the second display holder can be positioned to hold the second display card at an angle with respect to the first display card.

The clip portion can include a front clip wall and a back clip wall. The back clip wall can be the second wall of the first display holder.

Further aspects of the invention are disclosed in the Figures and are described herein.

BRIEF DESCRIPTION OF THE DRAWINGS

To understand the present invention, it will now be described by way of example, with reference to the accompanying drawings in which.

DETAILED DESCRIPTION

Figure 1:
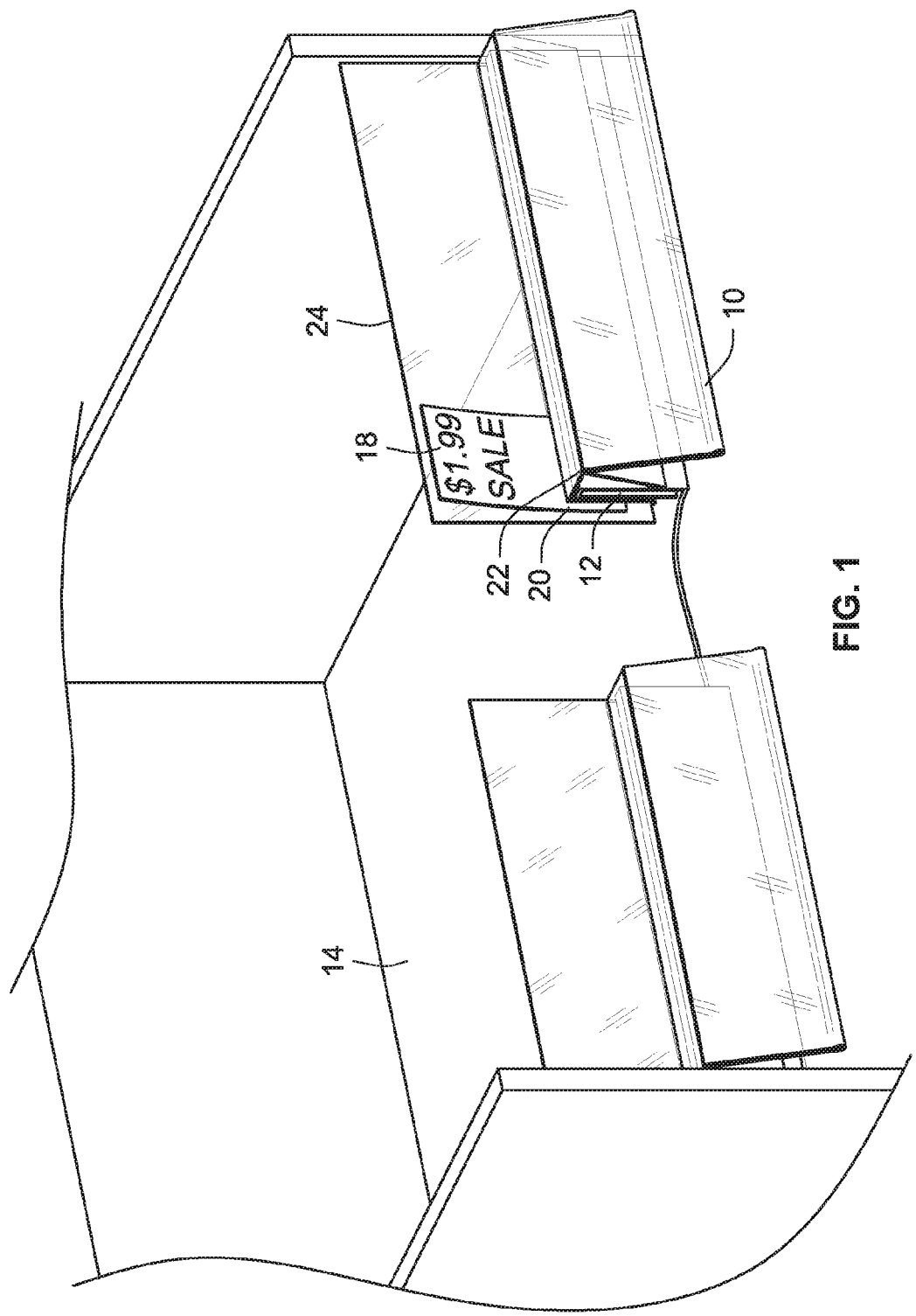
FIG. 1 is a perspective view of a shelf clip positioned on a lip of shelf, with a partial perspective cross-sectional view midway on the shelf, with a graphic display in a first graphic holder of the clip in accordance with the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is directed to a shelf clip that can be used to hold a first graphic card or similar material, and a second graphic card or similar material. The clip is designed to connect to a lip of a shelf. The clip can hold advertising, pricing information or other information or graphics. Additionally, the clip can be used to provide a wall to contain goods on the shelf.

FIG. 1 shows a clip 10 in accordance with the present invention connected to a lip 12 of a shelf 14. The clip 10 is formed from a clear or transparent plastic, or similar material, and spans from one side of the shelf 14 to the other side of the shelf 14. A first graphic card or display 18 is shown in a first holder 20 of the clip. The clip 10 can hold a plurality of graphic cards in the first holder 20. Moreover, the graphic cards can be of various widths and heights.

Figure 2:
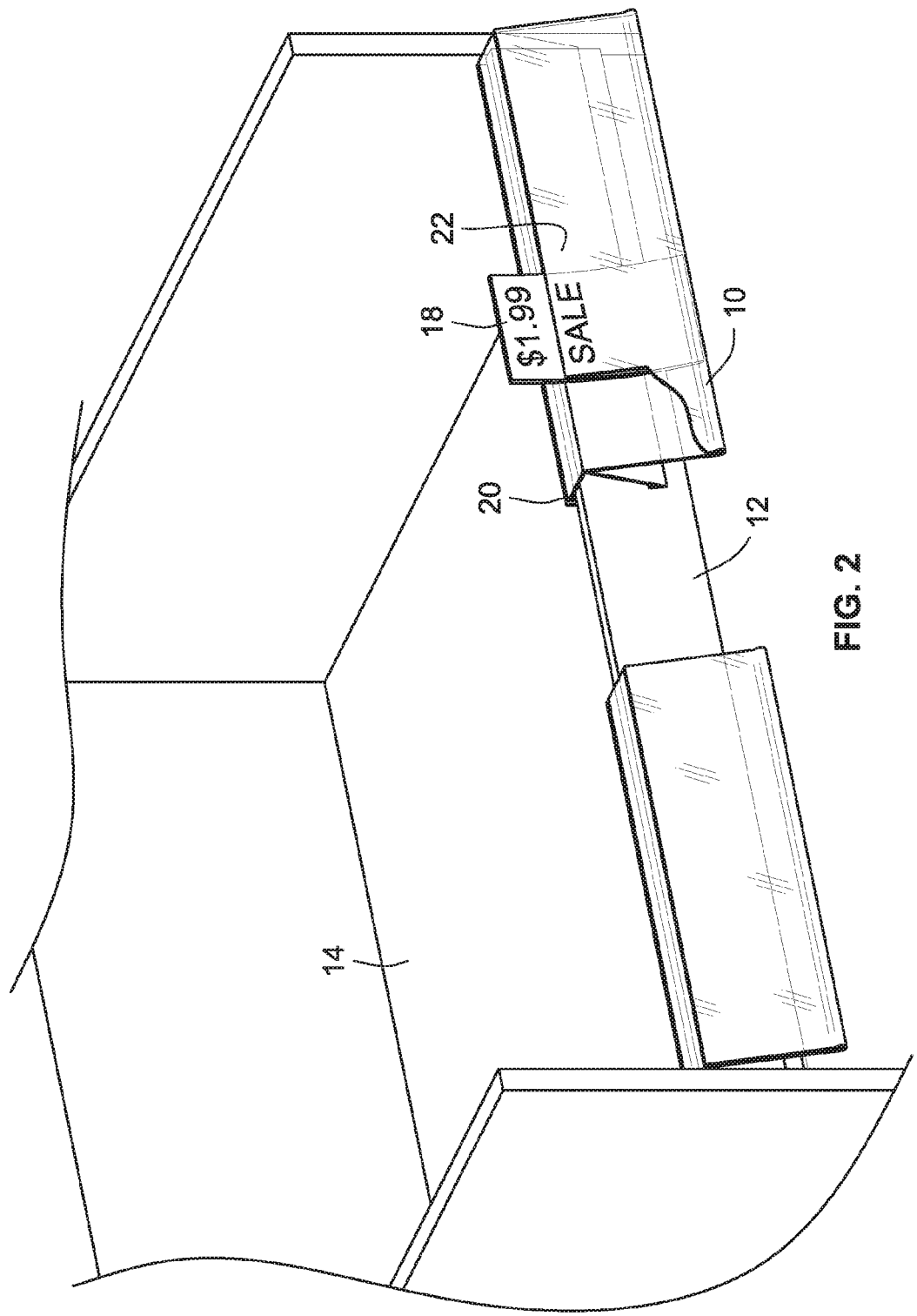
FIG. 2 is a perspective view of the shelf clip of FIG. 1 with a graphic display in a second graphic holder of the clip.

FIG. 2 shows a graphic card 18 in a second holder 22 of the clip 10. As evident in the Figures, the first graphic card holder 20 holds the graphic card 18 in a vertical position, while the second holder 22 holds the graphic card at an angle with respect to the first holder.

Figure 3:
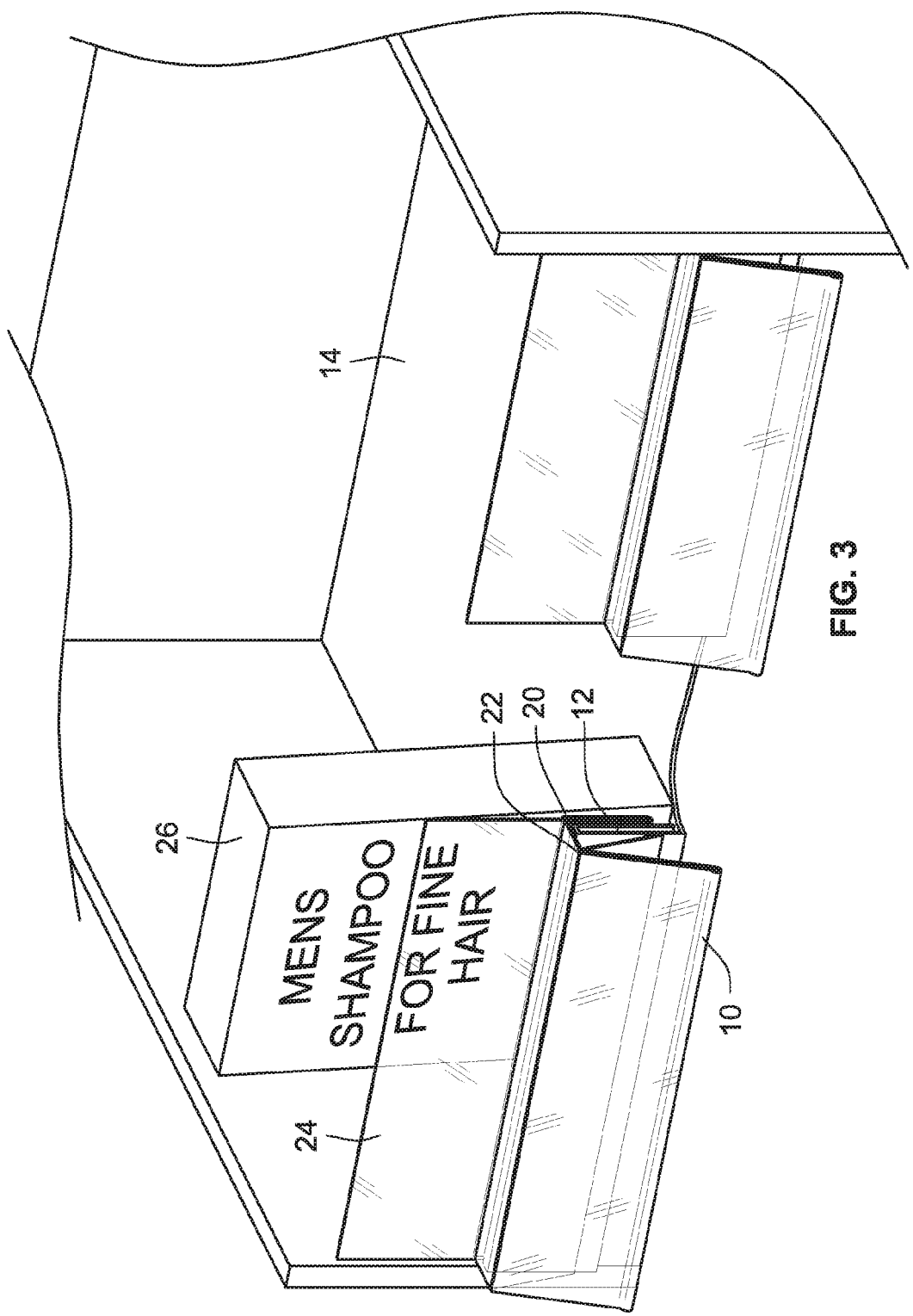
FIG. 3 is a perspective view of the shelf clip of FIG. 1, with a partial perspective cross-sectional view midway on the shelf, with a product blocking fence in the first graphic holder of the clip.

FIG. 3 illustrates use of the first holder 20 of the clip 10 holding a wall or fence 24 of clear plastic (the wall 24 can be also be formed from another similar material) that spans the length of the shelf 14. The wall 24 prevents goods 26 from falling off the shelf 14.

Figure 4:
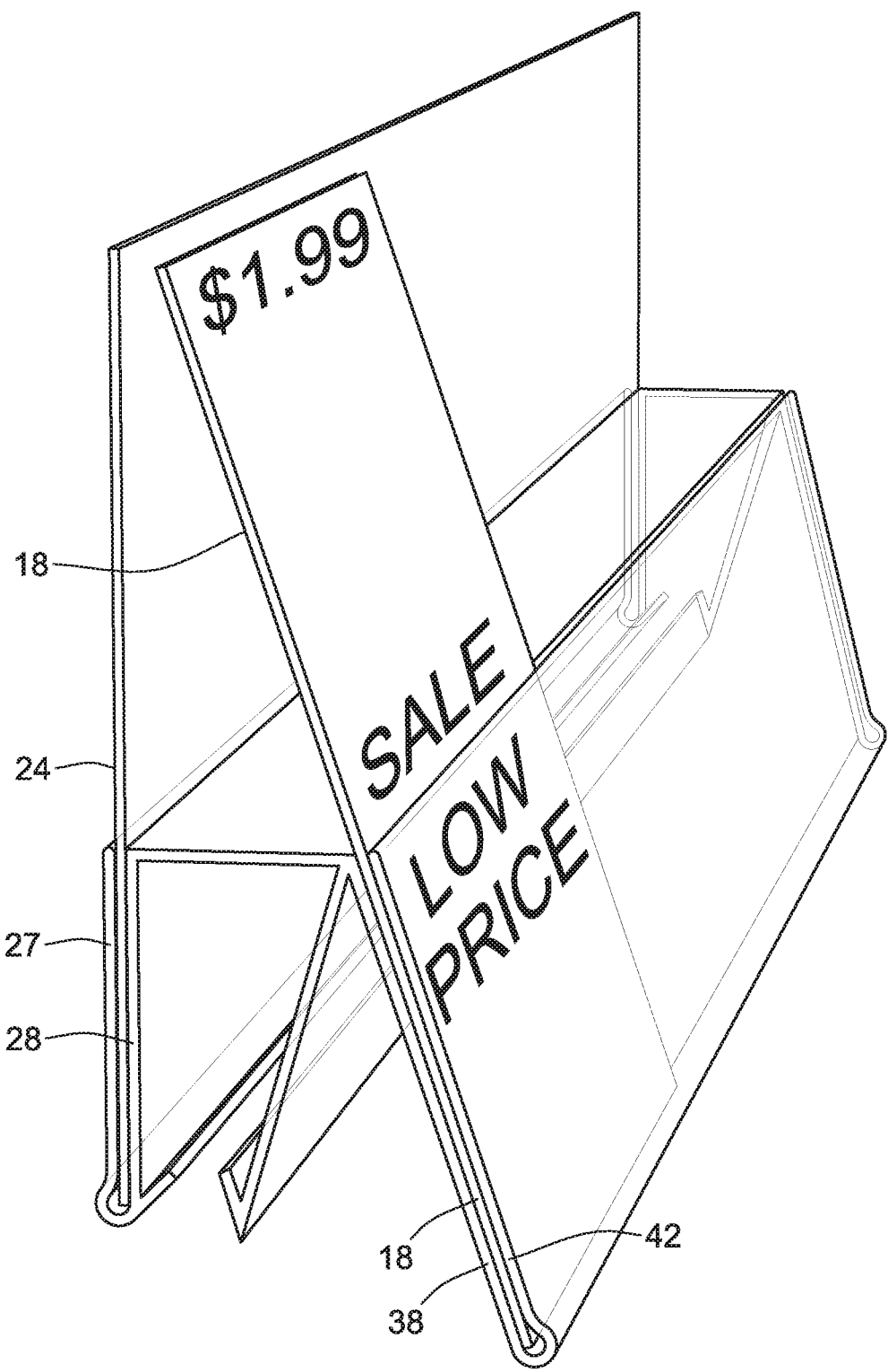
FIG. 4 is a perspective view of an end of the shelf clip of FIG. 1 removed from the lip of the shelf; and, FIG. 5 is a cross-sectional view of the clip of FIG. 1.
Figure 5:
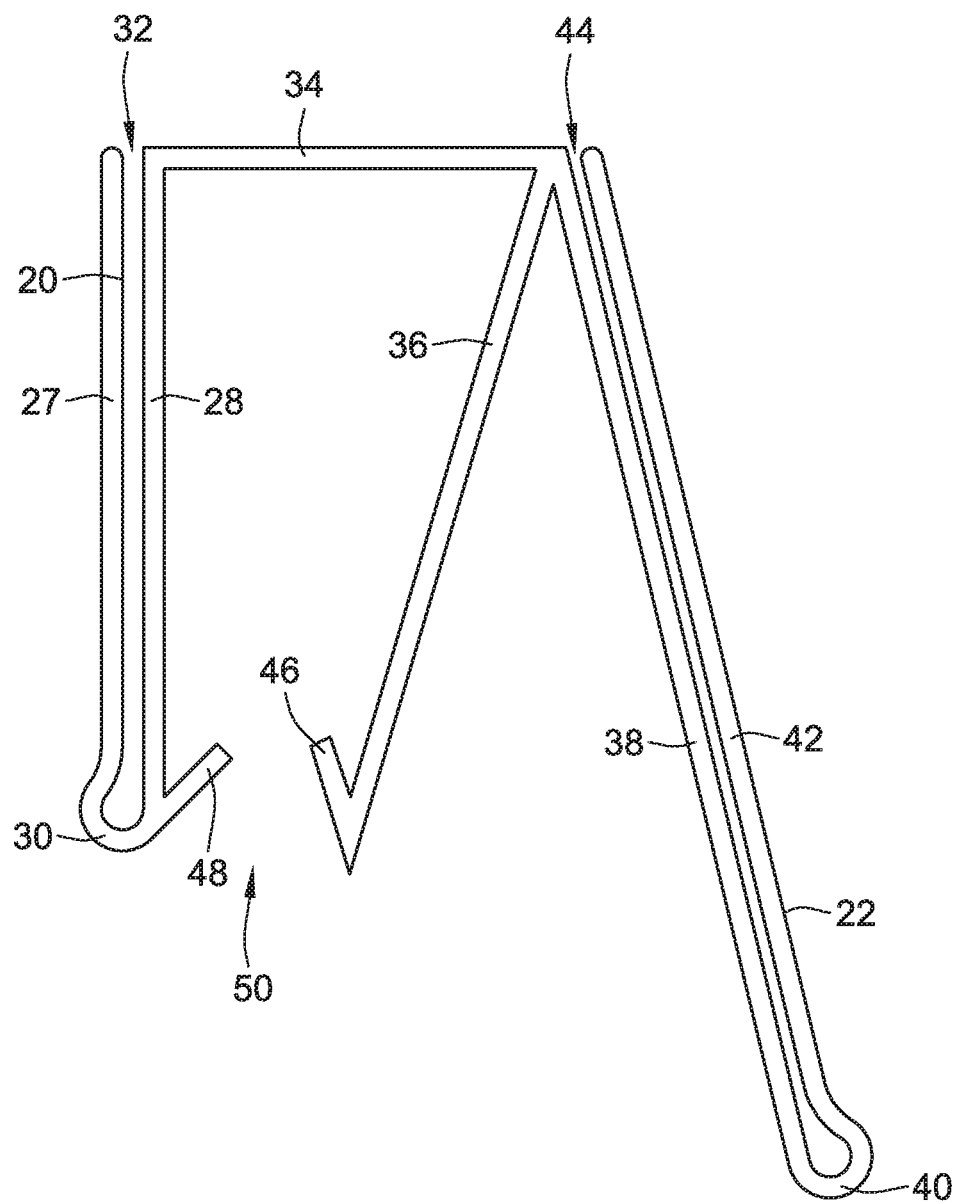

As illustrated in end view of FIG. 4 and the cross-sectional view of FIG. 5, the first display holder 20 is positioned at the back of the clip 10, and is formed from two substantially parallel walls 27, 28 connected at a lower end by an arcuate portion 30. The first holder 20 includes an open top 32 where one or more displays 18 (e.g., cards, advertisements, pricing, etc.) or walls 24 can be inserted. The parallel walls 27, 28 are generally vertical (when properly positioned on a shelf lip). While the walls 27, 28 are shown as vertical and substantially parallel to each other, one or both can be positioned to slant toward the other. This enables the first holder 20 to essentially pinch or grip any materials inserted into the holder 20. Typically, the clip 10 is formed from plastic or other similar material that has some flexibility. This flexibility allows for the walls 27, 28 to be pushed apart to insert a display or wall, and then flex back to hold the display 18 or wall 24 in place.

The top of wall 28 of the first holder 20 is connected to a first end of a generally horizontal top wall 34. The top wall 34 extends away from the opening 32 of the first holder 20 to both an inwardly angled front clip wall 36 and an outwardly angled first wall 38 of the second display holder 22.

The first wall 38 of the second display holder 22 is connected to an arcuate portion 40 at a lower end which is in turn connected to a second wall 42 of the second display holder 22. The first wall 38 and the second wall 42 of the second display holder 22 are shown as substantially parallel and form a top opening 44. Again, one or both walls can be slanted toward the other to better grip any display positioned in the holder 22. The entire holder 22 is angled or inclined outward (i.e., from top to bottom) from the clip 10.

The inwardly angled (again, from top to bottom) front wall clip 36 cooperates with the second wall 28 of the first display holder 20 and the top wall 34, to fit over the lip 12 of the shelf 14 to clip or secure the clip 10 to the shelf 14. To facilitate this, the front clip wall 36 includes a lower hook portion 46 extending upwardly and inwardly from the bottom of the front clip wall 36, and wall 28 of the first display holder 20 includes a lower hook portion 48 extending upwardly and outwardly from the bottom of the second wall 28. A downwardly facing opening 50 is defined between the hook portions 46, 48. Because the front clip wall 36 is angled toward the vertical first wall 28 of the first holder 20, it can flex about the lip 12 of the shelf 14 to allow the clip 10 to grip the shelf lip 12 when in place.

Many modifications and variations of the present invention are possible in light of the above teachings. It is, therefore, to be understood within the scope of the appended claims the invention may be protected otherwise than as specifically described.

We claim:

1. A shelf clip comprising:
    a clip portion for securing the shelf clip to a shelf, the clip portion including a top wall and a front clip wall connected at a first end to a first edge of the top wall and extending downward to a second end, and a back clip wall connected at a first end to a second edge of the top wall, the second edge of the top wall spaced from the first edge of the top wall;
    a first holder for holding one of a display card and a wall, the first holder including the back clip wall of the clip portion, wherein the first holder is aligned with the front clip wall; and,
    a second holder for holding a display card, the second holder including a first wall connected at a first end to the first edge of the top wall and extending to a second end wherein the second end of the first wall of the second holder is spaced from the second end of the front clip wall, and a second wall connected to the first wall of the second holder at the second end.

2. The shelf clip of claim 1 wherein the first holder includes a second wall connected to the back clip wall by an arcuate portion.

3. The shelf clip of claim 2 wherein the back clip wall and the second wall of the first holder are parallel to each other.

4. The shelf clip of claim 2 wherein the back clip wall and the second wall of the first holder are inclined toward each other to grip the one of a display card and a wall.

5. The shelf clip of claim 2 wherein the back clip wall and second wall of the first holder are vertical when the shelf clip is secured to a shelf.

6. The shelf clip of claim 1 holding a first display card in the first holder.

7. The shelf clip of claim 6 holding a second display card in the first holder.

8. The shelf clip of claim 1 wherein the first wall and the second wall of the second holder are connected by an arcuate portion.

9. The shelf clip of claim 8 wherein the first wall and the second wall of the second holder are parallel to each other.

10. The shelf clip of claim 8 wherein the first wall and the second wall of the second holder are inclined toward each other to grip the display card.

11. The shelf clip of claim 8 wherein the second holder is inclined at an angle with respect to the first holder.

12. The shelf clip of claim 1 wherein the front clip wall of the clip portion includes an upwardly inclined hook portion extending from a bottom portion of the front clip wall of the clip portion, and the first wall of the clip portion includes an upwardly inclined hook portion extending from a bottom portion of the first wall.

13. The shelf clip of claim 1 wherein the shelf clip is formed from plastic.

14. The shelf clip of claim 13 wherein the plastic is one of transparent and translucent.

15. A shelf clip for holding display materials comprising:
    a first display holder for holding a first display card;
    a clip portion integrally connected to the first display holder for securing the shelf clip to a shelf, the clip portion including a horizontal top wall, a back clip wall connected to an inner edge of the top wall and a front clip wall connected to an outer edge of the top wall, the inner edge of the top wall spaced from the outer edge of the top wall, and wherein the back clip wall is aligned with the front clip wall; and,
    a second display holder integrally connected to the clip portion for holding a second display card, the second display holder including a first wall connected to the outer edge of the top wall and extending downward to an arcuate portion connecting the first wall of the second display holder to a second wall of the second display holder, wherein the arcuate portion is spaced from the lower end of the front clip wall.

16. The shelf clip of claim 15 wherein the first display holder includes the back clip wall of the clip portion and a second wall, and is positioned to hold the first display card in a vertical position and the second display holder is positioned to hold the second display card at an angle with respect to the first display card.

\* \* \* \* \*